United States Patent [19]

Kohata et al.

[11] Patent Number: 5,511,630
[45] Date of Patent: Apr. 30, 1996

[54] POWER STEERING SYSTEM

[75] Inventors: Takashi Kohata; Toshihiko Aoyama; Yuichi Okada; Nobuyoshi Asanuma, all of Wako, Japan

[73] Assignee: Honda Giken Kogyo Kabushiki Kaisha, Tokyo, Japan

[21] Appl. No.: 257,772

[22] Filed: Jun. 9, 1994

[30] Foreign Application Priority Data

Jun. 10, 1993 [JP] Japan ................................ 5-138116

[51] Int. Cl.$^6$ ..................................................... B62D 5/20
[52] U.S. Cl. ........................... 180/142; 180/146; 180/141
[58] Field of Search .................................. 180/141, 142, 180/143, 146, 149, 132; 91/375 A; 74/388 PS

[56] References Cited

U.S. PATENT DOCUMENTS

| 4,561,316 | 12/1985 | Bolz et al. | 74/7 E |
|---|---|---|---|
| 5,265,019 | 11/1993 | Harara et al. | 180/141 |
| 5,267,627 | 12/1993 | Frank et al. | 180/142 |

FOREIGN PATENT DOCUMENTS

| 59-75864 | 4/1984 | Japan | 180/79 |
|---|---|---|---|
| 3-159874 | 7/1991 | Japan | 180/142 |

*Primary Examiner*—Margaret A. Focarino
*Assistant Examiner*—Victor E. Johnson
*Attorney, Agent, or Firm*—Nikaido, Marmelstein, Murray & Oram

[57] ABSTRACT

A power steering system is disclosed which automatically corrects unexpected variations in the path of a vehicle without requiring a driver to make corrections. A rotary valve in the power steering system includes an inner sleeve connected to a steering wheel, an outer sleeve connected to a pinion shaft meshed with a rack bar, and a torsion bar coupled to the inner sleeve and the pinion shaft. The rotary valve switches oil passages communicating with a power cylinder by means of relative rotation between the inner sleeve and the outer sleeve to thereby assist in steering. The outer sleeve and the pinion shaft are connected to each other for slight relative rotation through an elastomer or resilient connecting member. If an unexpected variation in path is produced in the vehicle, the outer sleeve is rotated by the operation of a torque motor which causes the operation of the rotary valve, thereby moving the power cylinder whereby a steering force is produced for correcting the variation in path.

9 Claims, 11 Drawing Sheets

FIG. 11

POWER STEERING SYSTEM

BACKGROUND OF THE INVENTION

1. Field of the Invention

The present invention is directed to a power steering system designed to assist in steering using hydraulic pressure in which oil passages communicating with a power cylinder are switched using a valve.

2. Description of the Prior Art

In general, a power steering system for a vehicle has been conventionally used in which an oil discharged by a hydraulic pump driven by the vehicle engine, is supplied into one of left and right oil chambers in a power cylinder using a valve which is switched in response to the operation of a steering wheel. Thus, the steering by the steering wheel is assisted by the driving force of the power cylinder.

In such prior art power steering systems, when the vehicle's path or course is unexpectedly changed in opposition to the operation of the steering wheel, a steering reaction force is applied to the steering wheel by an actuator so as to call the driver's attention to make a steering correction, as proposed by Japanese Patent Application Laid-Open No. 16879/91.

However, the above prior art power steering system suffers from a problem that when the vehicle is influenced by a road surface which is rough, cross wind, a torque steer, a puddle or the like which results in the loss of control of the steering wheel, the driver has to make a correction in accordance with a steering reaction force transmitted to the steering wheel, and such operation is troublesome and causes a fatigue.

SUMMARY OF THE INVENTION

The present invention has been accomplished with the above circumstances in view, and it is an object of the present invention to provide a power steering system wherein an unexpected variation in the path or course of the vehicle can be automatically corrected without relying on the driver's steering operation.

To achieve the above object, according to a first feature of the present invention, the oil passages of the power steering system which communicate with a power cylinder are switched from one to another by a rotary valve. The rotary valve includes an inner sleeve connected to a steering wheel, and outer sleeve connected to a pinion shaft meshed with a rack bar, and a torsion bar coupled to the inner sleeve and the pinion shaft. The system comprises a connecting means for connecting the outer sleeve to the pinion shaft and for permitting relative rotation between the outer sleeve and the pinion shaft. An actuator is provided for driving the outer sleeve for relative rotation with respect to the pinion shaft, steering-condition detecting means are provided for detecting steering-condition of a vehicle, motion condition detecting means are provided for detecting motion conditions of the vehicle, and control means are provided for controlling the driving of the actuator on the basis of outputs from the steering-condition detecting means and the motion condition detecting means.

According to a second feature of the invention, the connecting means comprises a resilient member.

According to a third feature of the invention, the connecting means comprises a resilient member which is preloaded.

According to a fourth feature, the power steering system is arranged so that oil passages communicating with a power cylinder are switched from one to another by a 4-way spool valve. The system comprises an actuator for switching the 4-way spool valve, steering-condition detecting means for detecting steering-conditions of a vehicle, motion condition detecting means for detecting motion conditions of the vehicle, and control means for controlling the driving of the actuator on the basis of outputs from the steering-condition detecting means and the motion condition detecting means.

DETAILED DESCRIPTION OF THE PREFERRED EMBODIMENTS

Figure 1:
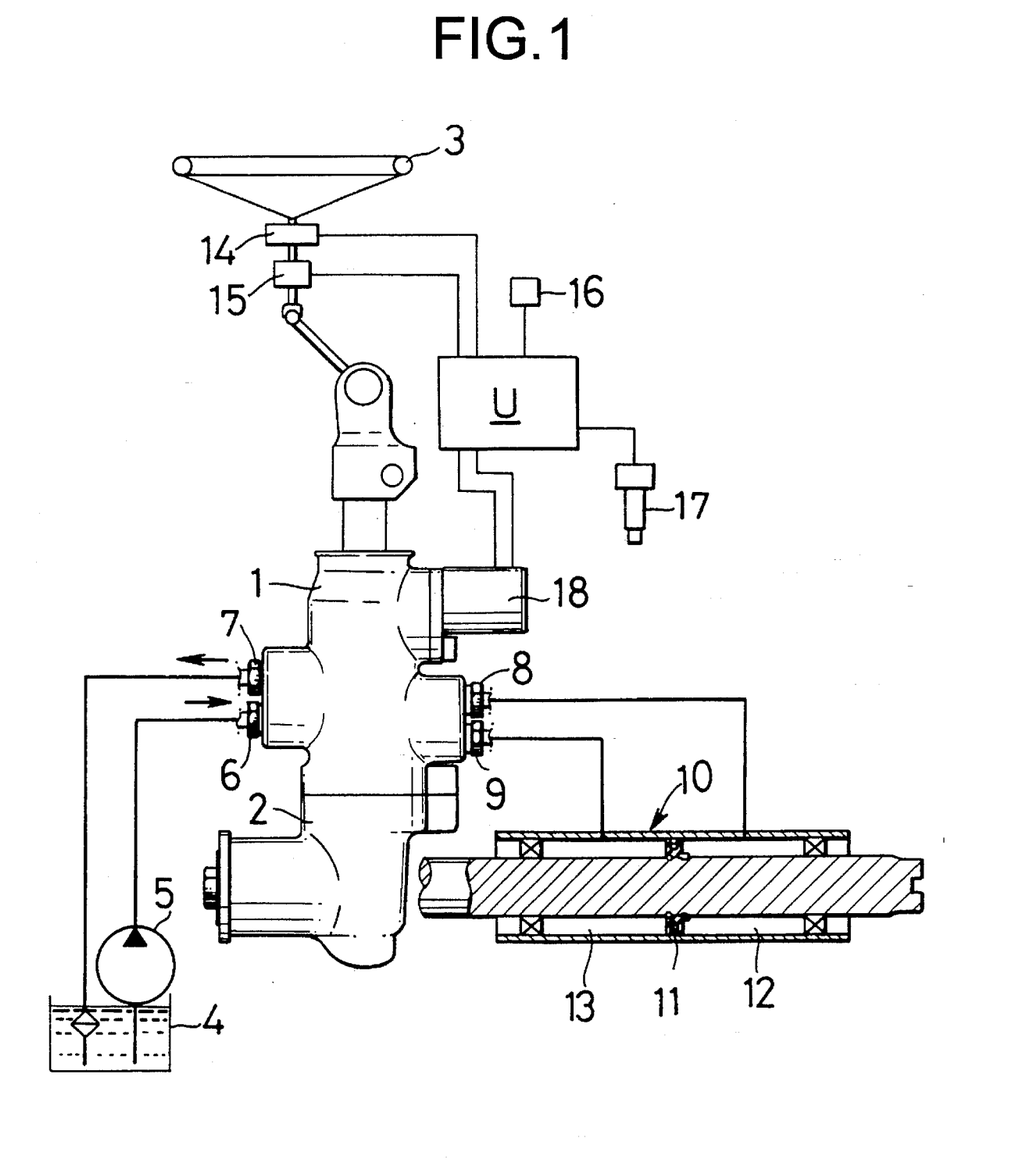
FIG. 1 is a power steering system according to the present invention.

As shown in FIG. 1, the power steering system includes a valve housing 1 and a gear housing 2 which are integrally coupled to each other. A rotary valve is positioned in the valve housing 1 for generating a steering hydraulic pressure in accordance with the operation of a steering wheel 3. A rack-pinion mechanism is positioned in the gear housing 2 for transmitting the steering force of the steering wheel 3 directly to steering control wheels.

The valve housing 1 includes a feed port 6 for supplying oil pumped from an oil tank 4 by a hydraulic pump 5, and a return port 7 for returning the oil from the rotary valve into the oil tank 4. The valve housing 1 is also formed with a first output port 8 and a second output port 9. The first and second output ports 8 and 9 communicate respectively with a pair of oil chambers 12 and 13 formed in a power cylinder 10 with a piston 11 interposed therebetween. Thus, when the rotary valve is operated by the operation of the steering wheel 3, the oil fed into the feed port 6 is selectively supplied into the first or second output ports 8 or 9, thereby driving the power cylinder 10 to assist the steering force by the rack-pinion mechanism.

An electronic control unit U makes calculations based upon signals from a steering angle sensor 14 which detects the steering angle of the steering wheel 3, a steering torque sensor 15 which detects the steering torque of the steering wheel 3, a yaw rate sensor 16 which detects the yaw rate of a vehicle, and a vehicle speed sensor 17 which detects the speed of the vehicle, thereby controlling the driving of torque motor 18 provided on an upper portion of the valve housing 1 to control the operational characteristic of the rotary valve. The magnitude of an output torque from torque motor 18 is controlled by the duty control of the voltage applied to the torque motor 18.

The structure of the rotary valve $V_1$ will be described below in detail in connection with FIG. 2.

A pinion shaft 23 is rotatably supported in the gear housing 2 with a ball bearing 21 and a roller bearing 22 interposed therebetween. The pinion shaft 23 has a pinion $23_1$ formed around an outer periphery thereof which meshes with a rack $24_1$ of a rack bar 24 slidably supported in the gear housing 2. The rack bar 24 is connected to the steering control wheels through a tie rod and a knuckle (both not shown). When the pinion shaft 23 is rotated by the operation of the steering wheel 3, the rack bar 24 is reciprocally driven through the pinion $23_1$ and rack $24_1$ to effect the steering of the steering control wheels. The power cylinder 10 is connected to the rack bar 24, so that the steering force is assisted by driving the power cylinder 10 using hydraulic pressure.

A cylindrical inner sleeve 25 is rotatably disposed in the valve housing 1 and is connected to the steering wheel 3 for rotation. A torsion bar 26 is coaxially fitted into the inner sleeve 25. The torsion bar 26 is coupled at its upper end to the inner sleeve 25 by a pin 27 and is coupled at its lower end by serrations to an upper end of the pinion shaft 23. Thus, the steering torque of the steering wheel 3 is transmitted from the inner sleeve 25 through the torsion bar 26 to the pinion shaft 23. The torsion bar 26 is torsionally deformed in proportion to the magnitude of the steering torque.

A cylindrical outer sleeve 28 is rotatably received between an outer periphery of a lower portion of the inner sleeve 25 and a valve bore 11 provided in an inner periphery of the valve housing 1. A plurality of elongated grooves $28_1$ are axially provided in an inner periphery of the outer sleeve 28, and a plurality of elongated grooves $25_1$ are provided in an outer periphery of the inner sleeve, so that they are opposed to an correspond to the elongated grooves $28_1$. The elongated grooves; $25_1$ in the inner sleeve 25 are capable of being selectively put into communication with the feed port 6 or the return port 7 through an oil passage $25_2$ defined within the inner sleeve 25, and the elongated grooves $28_1$ in the outer sleeve 28 are capable of being selectively put into communication with the first output port 8 or the second output port 9 through oil passages $28_2$ or $28_3$ defined in the outer sleeve 28.

Figure 4:
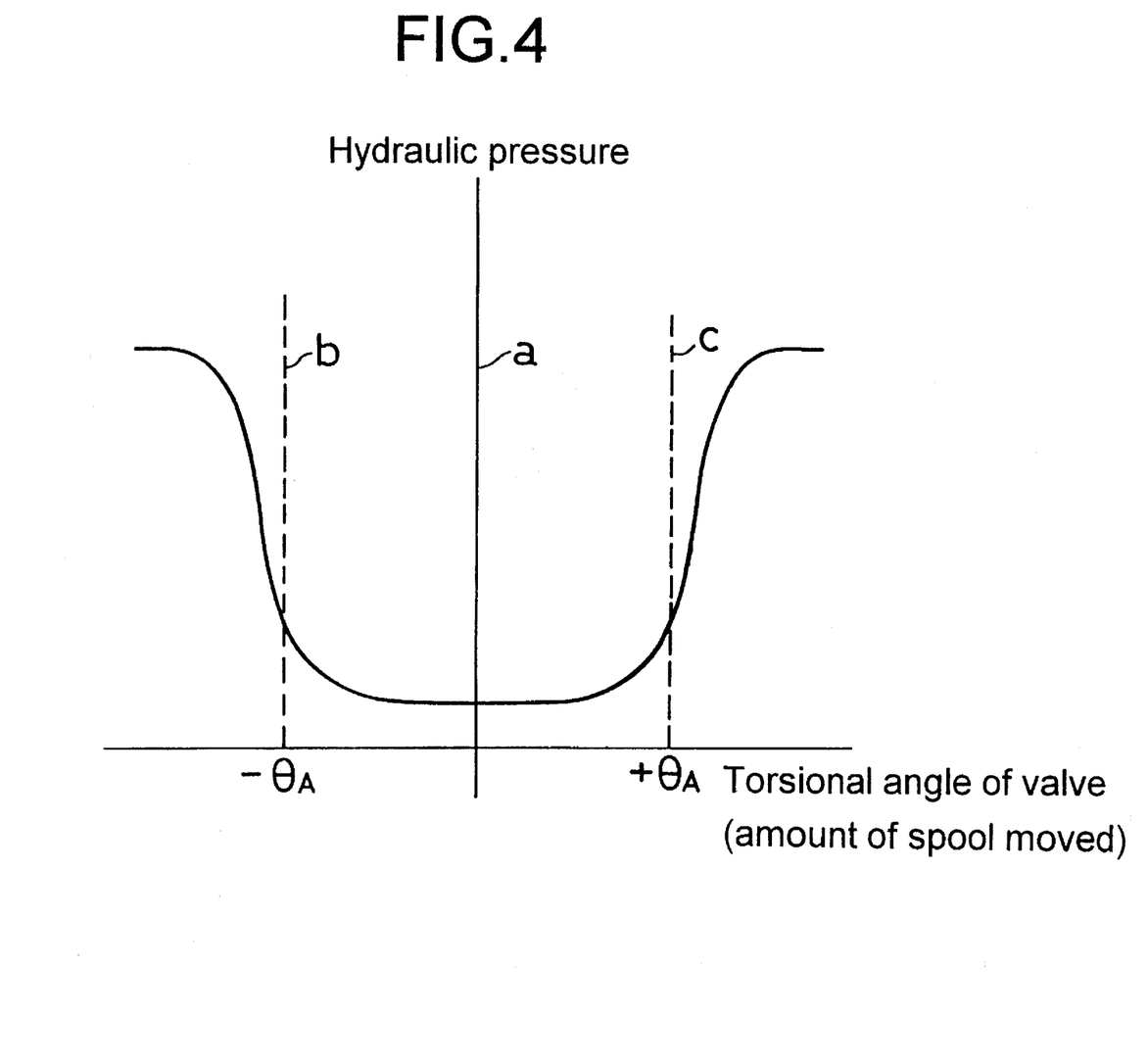
FIG. 4 is a graph illustrating the relationship between the torsional angle of the valve and the hydraulic pressure.

FIG. 4 illustrates the characteristic of the rotary valve $V_1$. The magnitude of a hydraulic pressure transmitted from the feed port 6 to the first output port 8 or the second output port 9 is determined so that it is maintained at an extremely small value in a region in which the relative rotational angle of the inner and outer sleeves 25 and 28 of the rotary valve $V_1$ (the torsional angle of the valve) is small. The hydraulic pressure increases abruptly, when the torsional angle of the valve is increased beyond a predetermined angle $\pm\Theta_A$.

A cylindrical connecting member 30 is rigidly coupled to an upper end of the outer sleeve 28 such that the outer sleeve 28 and connecting member 30 rotate together. The cylindrical connecting member 30 is rotatably fitted over the outer periphery of an intermediate portion of the inner sleeve 25, and supported on its outer periphery by an inner periphery of the valve housing 1 through a roller bearing 31. A bevel gear 33 is secured to an output shaft of the torque motor 18 and meshes with a bevel gear 32 which is fixedly press-fitted into an upper portion of the connecting member 30. Thus, torque from the torque motor 18 is transmitted through the pair of the bevel gears 32 and 33 via the connecting member 30 to the outer sleeve 28.

Figure 2:
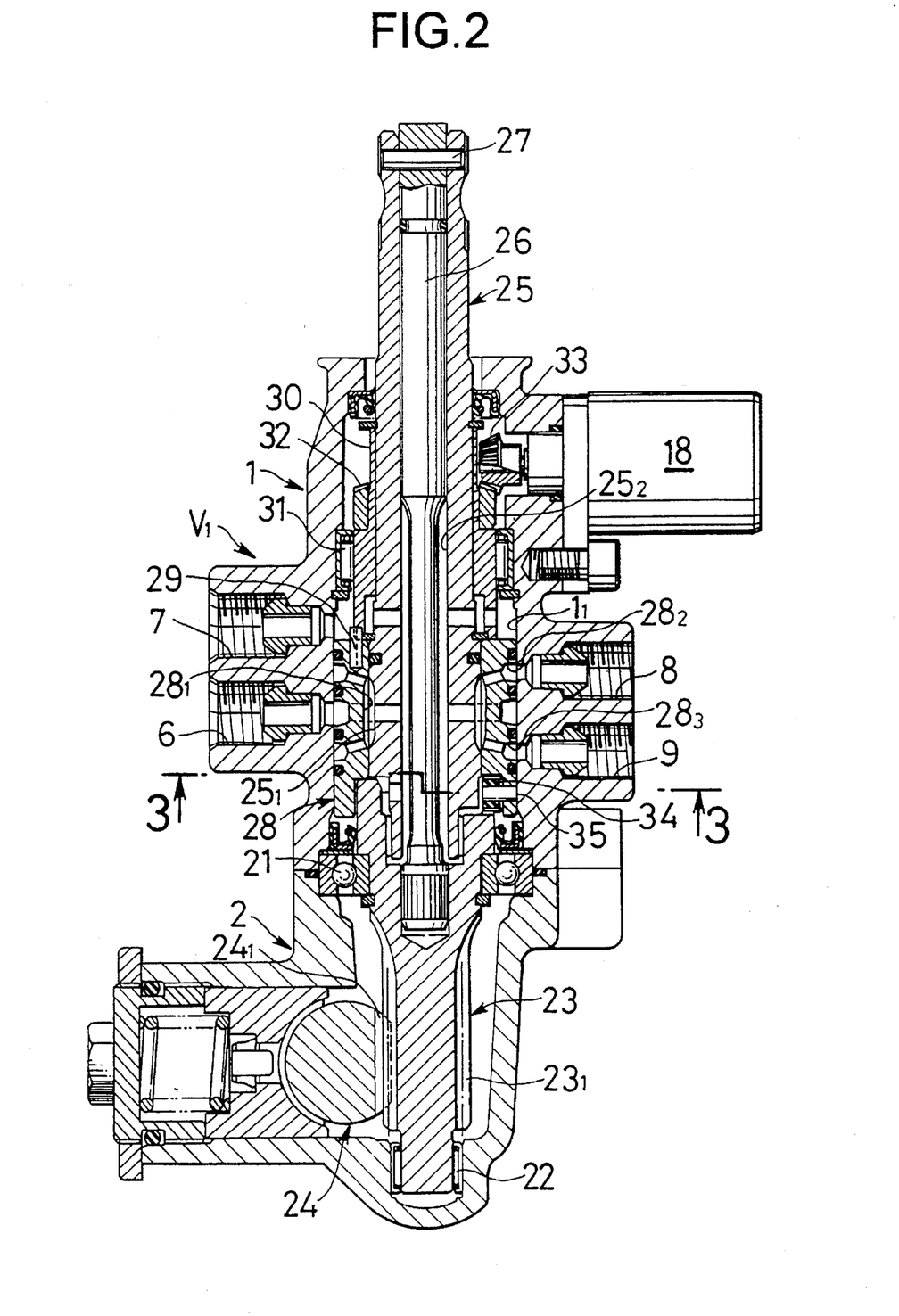
FIG. 2 is a vertical sectional view of a rotary valve of one embodiment of the present invention.
Figure 3:
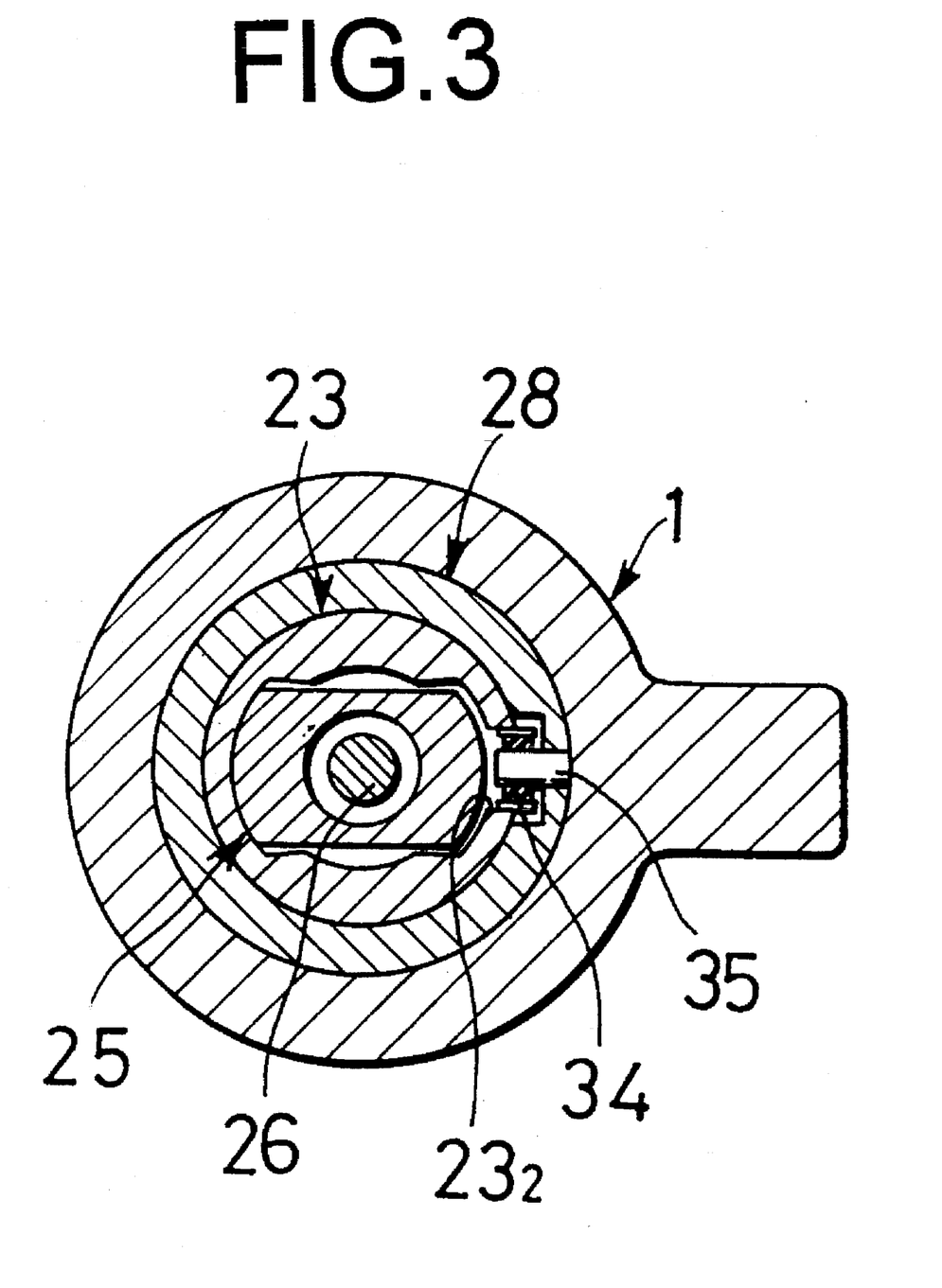
FIG. 3 is a sectional view taken along a line 3—3 in FIG. 2.

As can be seen from FIG. 2, together with FIG. 3, the pinion shaft 23 and the outer sleeve 28 are coupled to each other through an elastomer connecting member 34 made of, for example, a rubber, so that they rotate slightly relative to each other. More specifically, the elastomer connecting member 34 is supported on a pin 35 which is embedded in a radial direction in the inner periphery of the outer sleeve 28. The elastomer connecting member 34 is fitted into a notch $23_2$ provided in a portion of a circumference of the pinion shaft 23, whereby the outer sleeve 28 can be rotated through a very small angle (up to about 2.5°) in the leftward or rightward directions relative to the pinion shaft 23.

Figure 5:
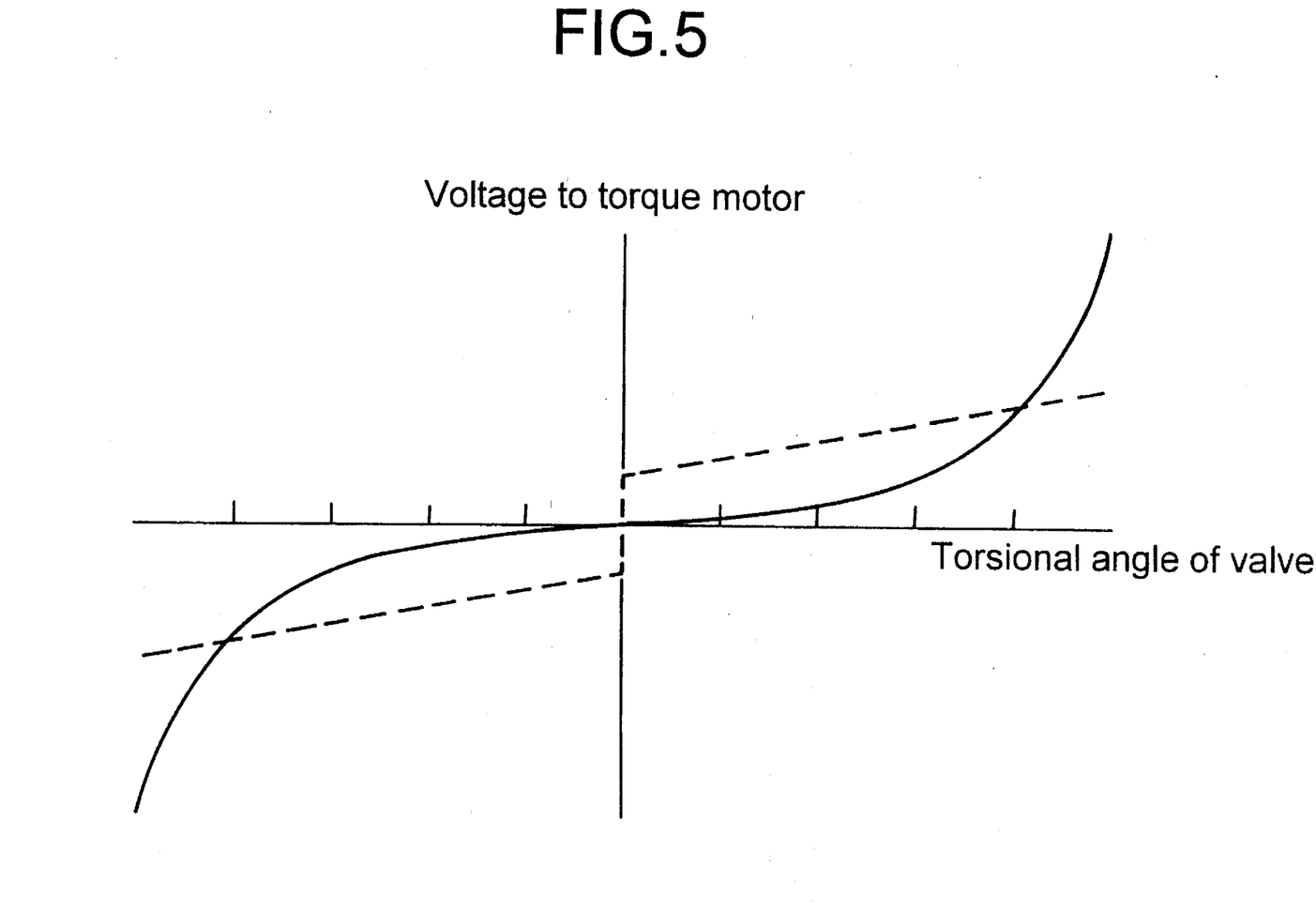
FIG. 5 is a graph illustrating the relationship between the torsional angle of the valve and the voltage of a valve actuator motor.

Thus, when a voltage is applied to the torque motor 18, causing the motor to produce a predetermined torque, the outer sleeve 28 is rotated through a very small angle relatively to the pinion shaft 23 by deformation of the elastomer connecting member 34, thereby operating the rotary valve $V_1$. The solid line in FIG. 5 indicates the relationship between the voltage applied to the torque motor 18 and the torsional angle of the rotary valve $V_1$ (the rotational angle of the outer sleeve 28 rotated by the deformation of the elastomer connecting member 34, on the assumption that the torsion bar 26 is not distorted).

The operation of the preferred embodiment of the present invention having the above-described construction will be described below.

When the steering wheel 3 is not operated, the torsion bar 26 is not deformed and hence, a difference in phase is not produced between the inner and outer sleeves 25 and 28, so that the oil supplied from the hydraulic pump 5 into the feed port 6 is returned through the return port 7 into the oil tank 4 without being fed into the power cylinder 10.

If the steering wheel 3 is operated to rotate the inner sleeve 25 in one direction, when the reaction force on a road surface is large as, for example, during rest-swinging or stationary turning, a relative rotation is produced, due to a torsional deformation of the torsion bar 26, between the inner sleeve 25 and the pinion shaft 23 to which the reaction force on the road surface is transmitted through the rack bar 24. At this time, the rotation of the pinion shaft 23 is transmitted through the elastomer connecting member 34 to the outer sleeve 28 and further therefrom through the pin 29, the connecting member 30 and the bevel gears 32 and 33 to the torque motor 18. However, the torque motor which is not energized, can be freely rotated with no load and hence, the pinion shaft 23 and the outer sleeve 28 are rotated together in such a manner that there is little deformation of the elastomer connecting member 34. As a result, a difference in phase corresponding to the torsional deformation of the torsion bar 26 is produced between the inner and outer sleeves 25 and 28.

When such a difference in phase has been produced between the inner and outer sleeves 25 and 28, one of the elongated grooves $25_1$ (provided in the outer periphery of the inner sleeve 25) is placed into communication with one of the elongated grooves $28_1$ (provided in the inner periphery of the outer sleeve 28), so that the oil supplied from the oil pump 5 into the feed port 6 is fed into one of the oil chambers 12 in the power cylinder 10. For example, oil is supplied through the elongated grooves $25_1$, the elongated grooves $28_1$, the oil passages $28_2$ and the first output port 8. The oil in the other oil chamber 13 is returned through the second output port 9, the oil passage $28_3$, the elongated grooves $28_1$, the elongated grooves $25_1$, the oil passage $25_2$ and the return port 7 into the oil tank 4.

When the piston 11 is operated by the oil supplied into the oil chamber 12 in the power cylinder 10, the rack bar 24 is driven in the same direction as a steering direction of the steering wheel 3 by a driving force of the piston 11, thereby assisting in steering. On the other hand, when the steering wheel 3 is turned in the reverse direction, a difference in phase in the reverse direction is produced between the inner and outer sleeves 25 and 28, so that the oil is supplied into the oil chamber 13 in the power cylinder 10. The rack bar 24 is therefore driven in the reverse direction, thereby assisting in the steering.

Figure 6:
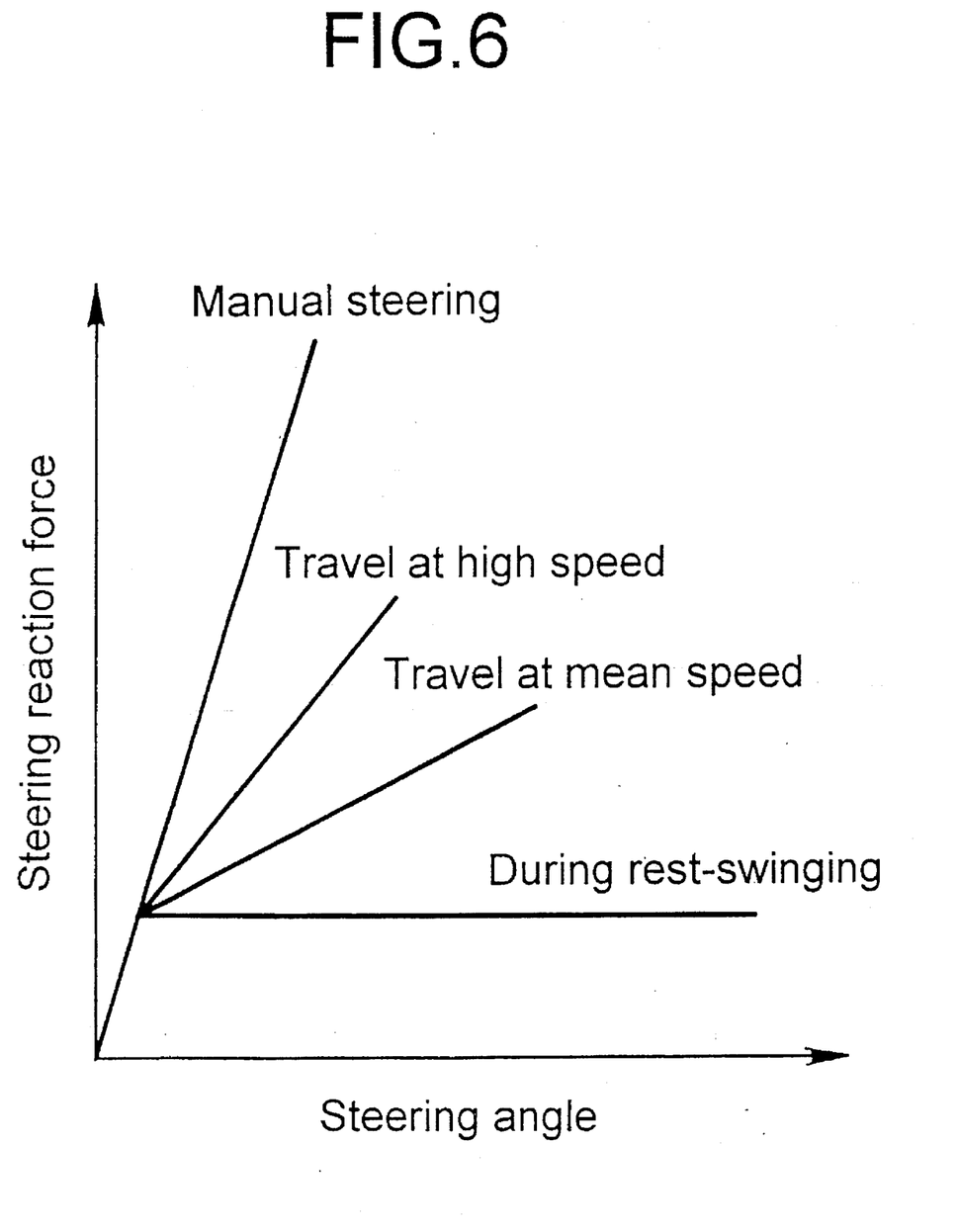
FIG. 6 is a graph illustrating the relationship between the vehicle speed and the reaction force against steering of the vehicle.

In this manner, a steering reaction characteristic as shown in FIG. 6 can be provided by allowing a small hydraulic pressure assisting force to be produced during traveling of the vehicle at a high speed with a small reaction force on a road surface, and by allowing a large hydraulic pressure assisting force to be produced during traveling of the vehicle at a low speed with a large reaction force on a road surface.

In general, if a moving vehicle is influenced by a road surface which is rough, cross wind, a torque steer, a puddle or the like, the steering wheel 3 falls into a so-called attracted-steering state, so that the course or path of the vehicle is disturbed. For this reason, the driver has to steer the steering wheel for a fine correction to maintain a correct course. In the power steering system according to the present invention, however, the correction of the course against the external disturbance is automatically made in the following manner:

In the electronic control unit U, an actual yaw rate actually detected by the yaw rate sensor 16 is compared with a reference yaw rate determined from outputs from the steering angle sensor 14, the steering torque sensor 15 and the vehicle speed sensor 17. If the actual yaw rate deviates from the reference yaw rate, then it is decided that there is a variation in path due to an external disturbance which is not intended by the driver; and a predetermined voltage is applied to the torque motor 18.

As a result, the torque of the torque motor 18 is transmitted through the bevel gears 33 and 32, the connecting member 30 and the pin 29 to the outer sleeve 28 to rotate the outer sleeve relative to the pinion shaft 23 while deforming the elastomer connecting member 34. When the outer sleeve 28 is rotated relative to the pinion shaft 23, it is also rotated relative to the inner sleeve 25 connected through the torsion bar 26 to the pinion shaft 23, and a relative rotation corresponding to the amount the elastomer connecting member 34 is deformed is produced between the inner and outer sleeves 25 and 28.

When a torsional angle is generated in the rotary valve $V_1$ by the torque motor 18 and the electronic control unit U in the above manner, hydraulic pressure is supplied from the hydraulic pump 5 into the power cylinder 10, so that the steering control wheels are automatically turned to correct the variation in path due to the external disturbance. Thus, the driver does not have to correct the variation in path due to the external disturbance, leading to a considerably reduced degree of fatigue of the driver.

The operation of the rotary valve $V_1$ by the torque motor 18 is applicable not only to the automatic correction of the variation in path due to the external disturbance, but also to the control of the steering reaction force or the steering responsiveness.

As shown in FIG. 4, when no voltage is applied to the torque motor 18, a neutral position of the steering wheel 3 corresponds to the solid line a. The hydraulic pressure rises when the steering wheel 3 is turned leftward from the neutral position to produce a leftward torsional angle in the rotary valve $V_1$ and the hydraulic pressure rises when the steering wheel 3 is turned rightward from the neutral position to produce a rightward torsional angle in the rotary valve $V_1$. The rise in hydraulic pressure in both right and left turning has the same laterally symmetric characteristics. However, by applying a predetermined voltage to the torque motor 18 in accordance with the operational condition of the vehicle, a torsional angle corresponding to the amount of deformation of elastomer connecting member 34 can be provided to the rotary valve $V_1$, thereby causing the neutral position of the steering wheel 3 to be shifted from the position shown by the solid line a, for example, to a position shown by a dashed line b.

If the neutral position of the steering wheel 3 is shifted to the position shown by a dashed line b, when the steering wheel 3 is turned leftward, the hydraulic pressure rises quickly, leading to a decreased steering reaction force and an enhanced steering responsiveness. Conversely, when the steering wheel 3 is turned rightward, the rise of the hydraulic pressure is delayed, leading to an increased steering reaction force and a reduced steering responsiveness. If the polarity of the voltage applied to the torque motor 18 is inverted, the neutral position of the steering wheel 3 is shifted to a position shown by a dashed line c, and hence, a reverse characteristic from the above-described characteristic can be obtained. Thus, it is possible to perform appropriate steering adapted for the operational condition of the vehicle and to provide a steering feeling suitable to the preference of a driver, by controlling the voltage applied to the torque motor 18 and the polarity thereof.

Figure 7:
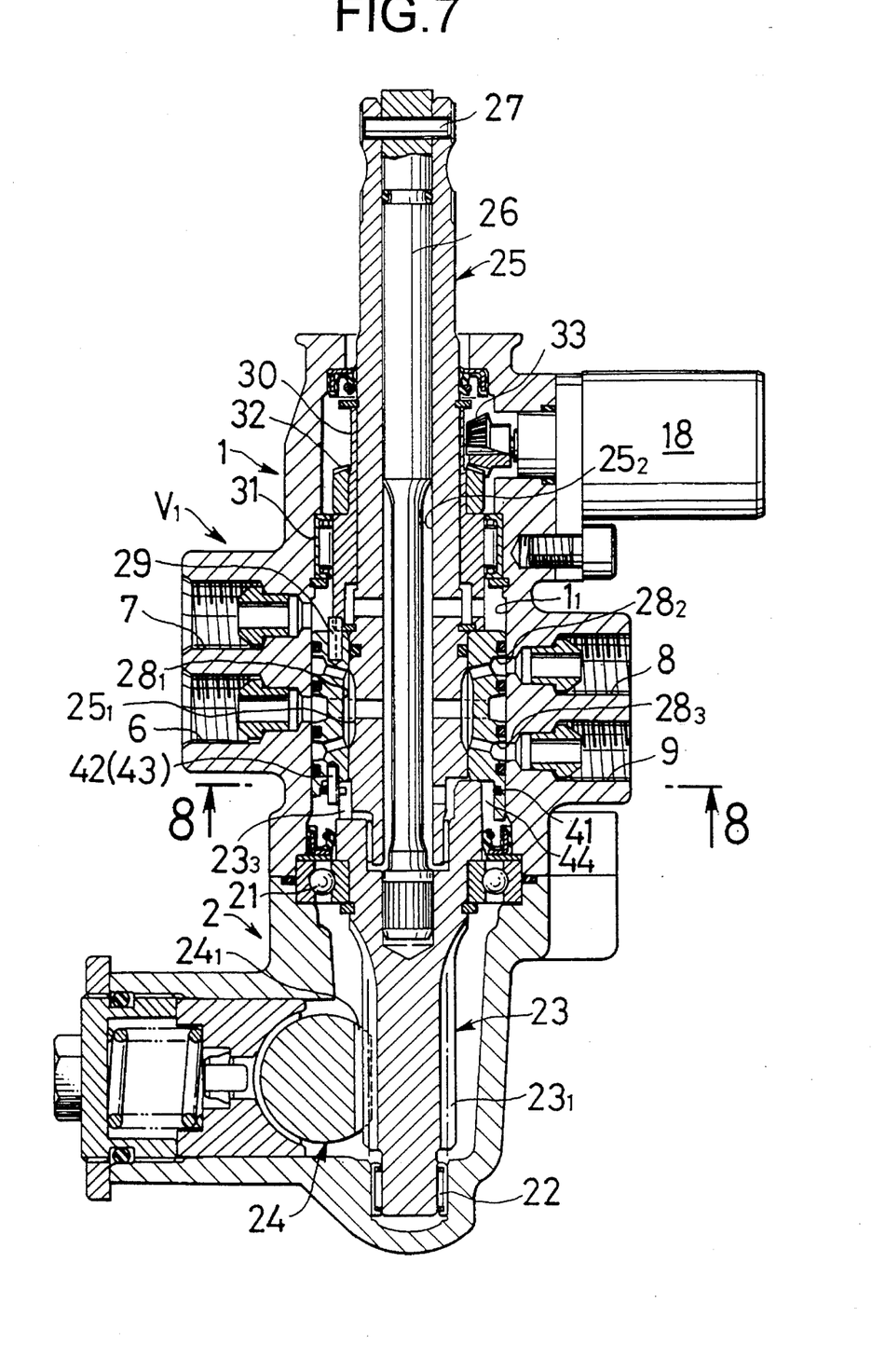
FIG. 7 is a vertical sectional view similar to FIG. 2, but illustrating a rotary valve of a second embodiment of the present invention.

A second embodiment of the present invention will now be described in connection with FIGS. 7 and 8.

The second embodiment has a feature in that in place of the elastomer connecting member 34 made of the rubber in the first embodiment, a resilient connecting member 41 comprising a C-shaped metal spring is used. More specifically, two pins 42 and 43 are embedded in downward y-directed attitudes at a predetermined distance in a lower end of an outer sleeve 28. The resilient connecting member 41 is disposed in an annular clearance defined between the inner periphery of the outer sleeve 28 and an outer periphery of a pinion shaft 23, and has locking portions $41_1$ and $41_2$ formed at its opposite ends and locked in a notch $23_1$ formed in the two pins 42 and 43 and the pinion shaft 23.

Figure 8:
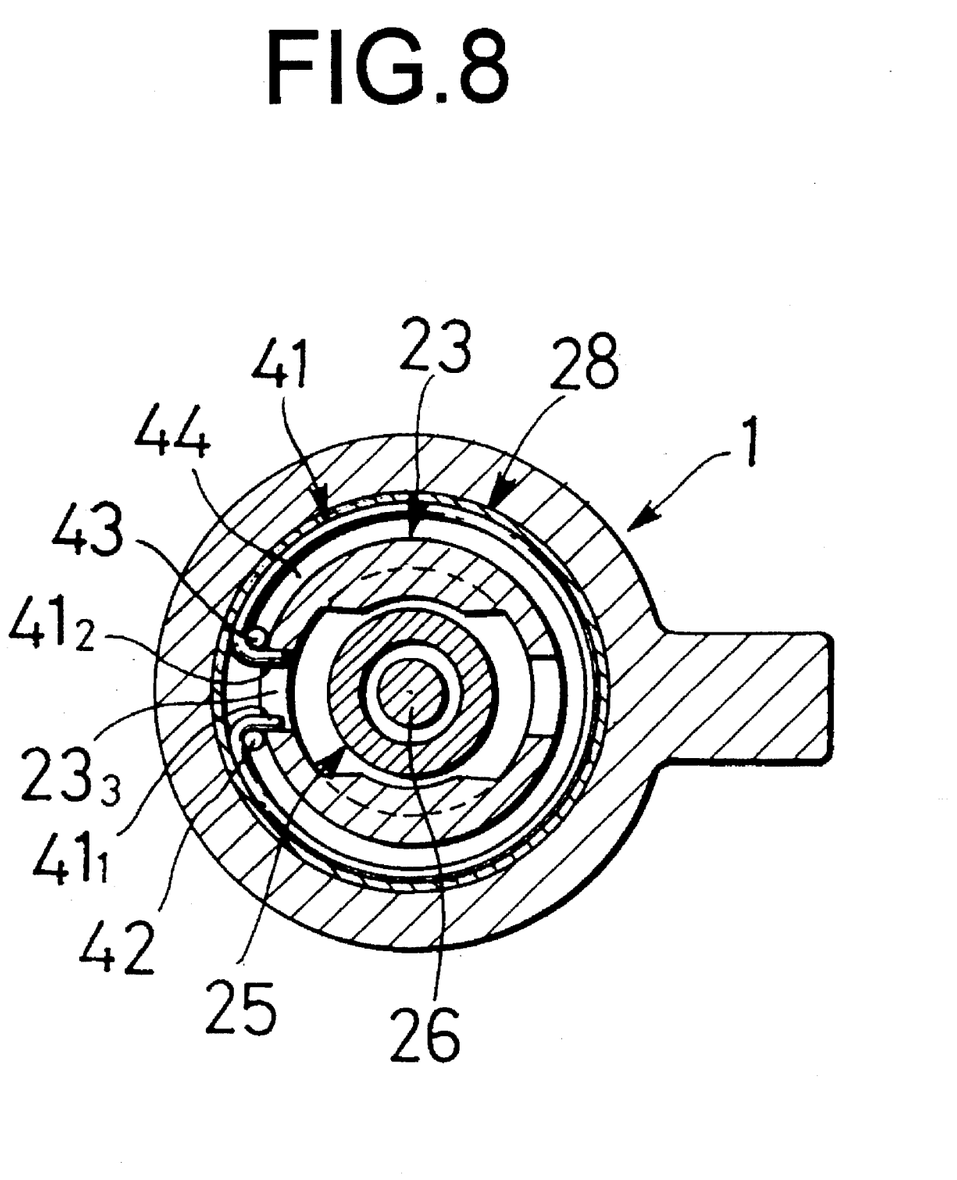
FIG. 8 is a sectional view taken along a line 8—8 in FIG. 7.

Thus, if the outer sleeve 28 is rotated in a clockwise direction as shown in FIG. 8 by the operation of the torque motor 18, the two pins 42 and 43 are rotated in the clockwise direction in unison with the outer sleeve 28. During this time, one of the locking portions $41_2$ of the resilient connecting member 41 is locked in the notch $23_3$ in the pinion shaft 23 and hence, cannot be moved, but the other locking portion $41_2$ is pulled by the pin 42 and moved in the clockwise direction, so that the resilient connecting member 41 is resiliently deformed within the clearance 44 to reduce its diameter. As a result, the outer sleeve 28 is rotated in the clockwise direction relative to the pinion shaft 23, while resiliently deforming the resilient connecting member 41. Conversely, if the outer sleeve 28 is rotated in a counterclockwise direction by the operation of the torque motor 18, the one locking portion $41_2$ of the resilient connecting member 41 is pulled by the pin 43 and moved in the counterclockwise direction, so that the outer sleeve 28 is rotated in the counterclockwise direction relative to the pinion shaft 23, while resiliently deforming the resilient connecting member 41.

A preset load is applied to the resilient connecting member 41 in its diameter reducing direction and hence, when a small voltage is applied to the torque motor 18, the outer sleeve 28 cannot be rotated. Only when the voltage applied is increased, so that the rotational torque of the outer sleeve 28 exceeds the preset load of the resilient connecting member 41, is the resilient connecting member 41 resiliently deformed to rotate the outer sleeve 28 (see a characteristic shown by a dashed line in FIG. 5). The magnitude of the preset load of the resilient connecting member 41 is set at a value which overcomes a frictional resistance and an inertial resistance to the rotation of the torque motor 18.

If the pinion shaft 23 is rotated by a steering torque transmitted thereto from the steering wheel 3 through the inner sleeve 25 and the torsion bar 26 when no voltage is applied to the torque motor 18, such rotation is transmitted through the resilient connecting member 41 via the outer sleeve 28 to the torque motor 18 to freely rotate the torque motor 18 with no load. At this time, the outer sleeve 28 and the pinion shaft 23 are rotated in unison with each other without unnecessary resilient deformation of the resilient connecting member 41, because the magnitude of the preset load of the resilient connecting member 41 is set at the value which overcomes the frictional resistance and the inertial resistance to the rotation Of the torque motor 18. As a result, an unnecessary torsional. angle is prevented from being produced in the rotary valve $V_1$, leading to the enhanced accuracy of the control of the hydraulic: pressure by the rotary valve $V_1$.

Figure 9:
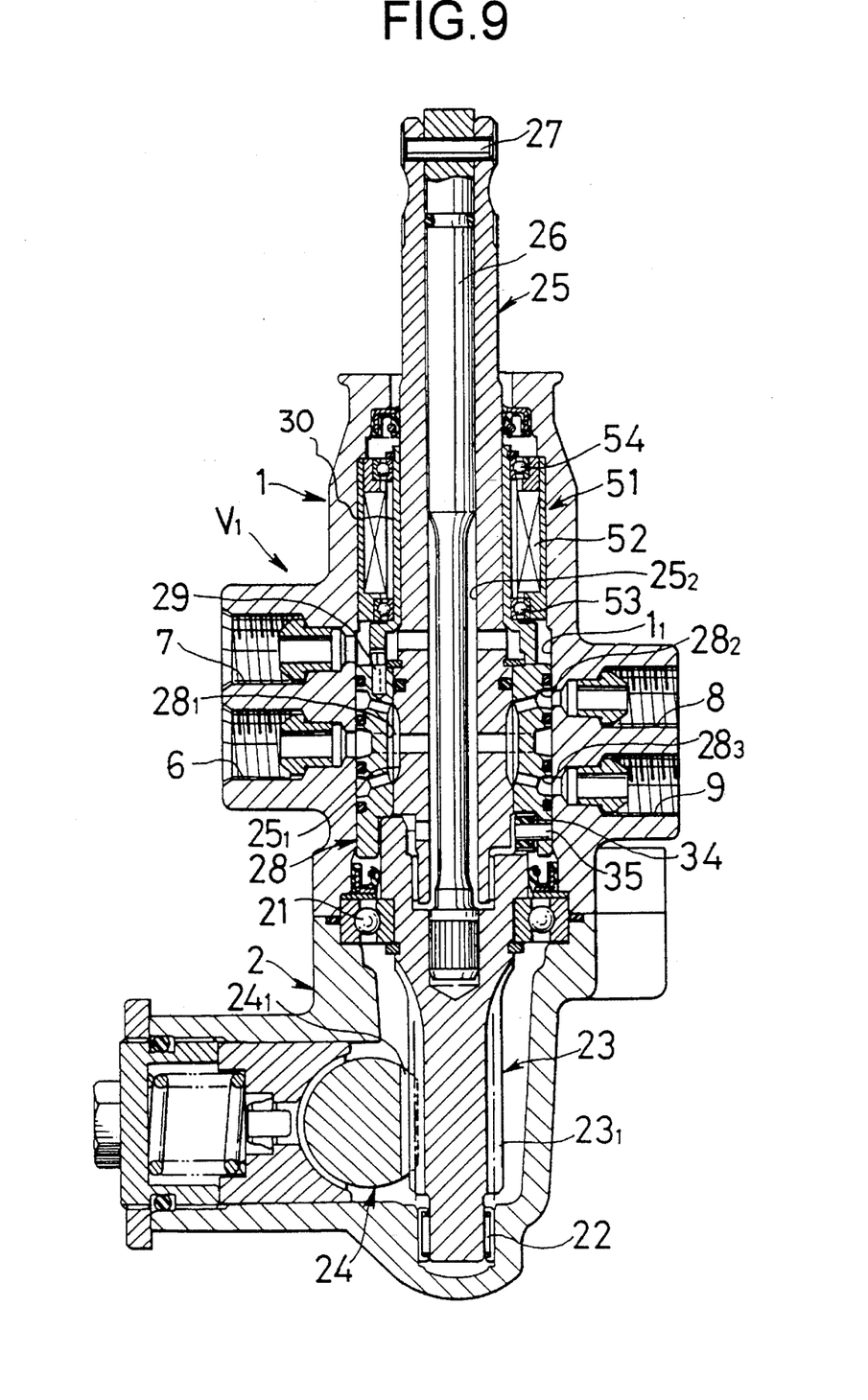
FIG. 9 is a sectional view similar to FIG. 2, but illustrating a rotary valve of a third embodiment of the present invention.

A third embodiment of the present invention will be described below in connection with FIG. 9.

The third embodiment has a feature in that in place of the torque motor 18 being externally mounted on the valve casing 1 as in the first embodiment, a torque motor 51 located in the valve casing 1 is used. The torque motor 51 includes a coil 52 supported on the inner periphery of the valve casing 1. A pair of ball bearings 53 and 54 are disposed between a connecting member 30 formed of a permanent magnet and the coil 52. If the coil is energized, the connecting member 30 is directly rotated, and the torque thereof is transmitted through the pin 29 to the outer sleeve 28. A power steering system of the third embodiment can be small-sized by the fact that the torque motor 51 is located in the valve casing 1.

Figure 10:
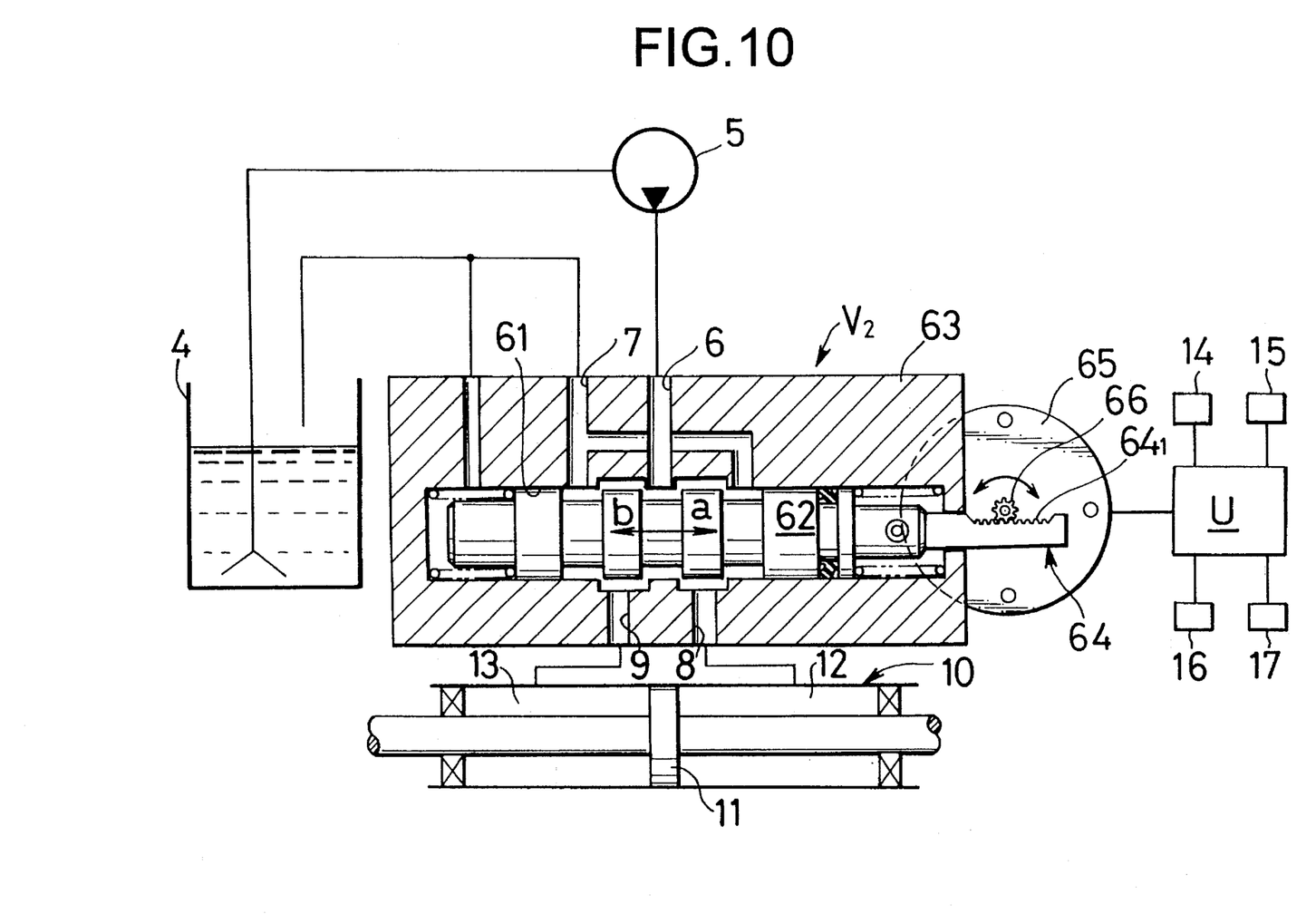
FIG. 10 is a view illustrating a power steering system according to a fourth embodiment of the present invention.

A fourth embodiment of the present invention will be described below in connection with FIG. 10.

A power steering system in the fourth embodiment includes a 4-way spool valve $V_2$ for selectively introducing an oil supplied from the hydraulic pump 5 into one of the left and right oil chambers 12 and 13 in the power cylinder 10. The valve $V_2$ is used in place of the valve $V_1$ in the above-described embodiments. A spool 62, having a rod portion 64, is slidably received in a valve bore 61 in the 4-way spool valve $V_2$, the rod 64 extending out of a valve housing 63. A pinion 66 of a torque motor 65 is meshed with a rack $64_1$ formed on the rod 64. The torque motor 65 is connected to the electronic control unit U and is driven on the basis of signals from the steering angle sensor 14 for detecting a steering angle of the steering wheel 3, the steering torque sensor 15 for detecting a steering torque of the steering wheel 3, the yaw rate sensor 16 for detecting a yaw rate of the vehicle, and the vehicle speed sensor 17 for detecting the speed of the vehicle.

When an actual yaw rate detected by the yaw rate sensor 16 is equal to a reference yaw rate determined from outputs from the steering angle 14, the steering torque sensor 15 and the vehicle speed sensor 17, it is decided that there is no variation in path due to an external disturbance not intended by a driver, and the energization of the torque motor 65 is stopped. As a result, the spool 62 of the 4-way spool valve $V_2$ is maintained at a neutral position shown in FIG. 10, so that the oil supplied from the hydraulic pump 5 to the feed port 6 is returned through the return port 7 to the oil tank 4, thereby bringing the power cylinder 10 into an inoperative state in which no steering force is produced by a hydraulic pressure.

If an unexpected variation in the path of the vehicle is produced due to an external disturbance, a predetermined voltage is applied from the electronic control unit U to the torque motor 65, and the spool 62 is driven, for example, in a direction indicated by an arrow a by the output torque from the torque motor 65. As a result, the oil supplied from the hydraulic pump 5 to the feed port 6 is fed through the first output port 8 into one of the oil chambers 12 in the power cylinder 10, and the oil in the other oil chamber 13 is returned through the second output port 9 and the return port 7 to the oil tank 4, thereby driving the power cylinder 10. This causes the steering control wheels to be automatically steered to correct the variation in course due to the external disturbance, thereby maintaining the course of the vehicle constant.

If the variation in the path of the vehicle due to the external disturbance is in a reverse direction, a force in the direction indicated by an arrow b is applied from the torque motor 65 to the spool 62, thereby correcting the variation in path of the vehicle due to the external disturbance. Thus, the driver is released from correcting the variation in the path of the vehicle due to the external disturbance.

The operation of the 4-way spool valve $V_2$ by the torque motor 65 is applicable not only to the automatic correction of the variation in the path of the vehicle due to the external disturbance, but also to the control of a steering reaction force and the steering responsiveness.

More specifically, if the neutral position of the steering wheel 3 is shifted from the position shown by the solid line a in FIG. 4 to the position shown by the dashed line b or the position shown by the dashed line c, a steer assisting force using the hydraulic pressure can be produced to any extent, thereby providing an optimal steering reaction force according to a current steering condition or a current operational condition to enhance the steering feeling.

Figure 11:
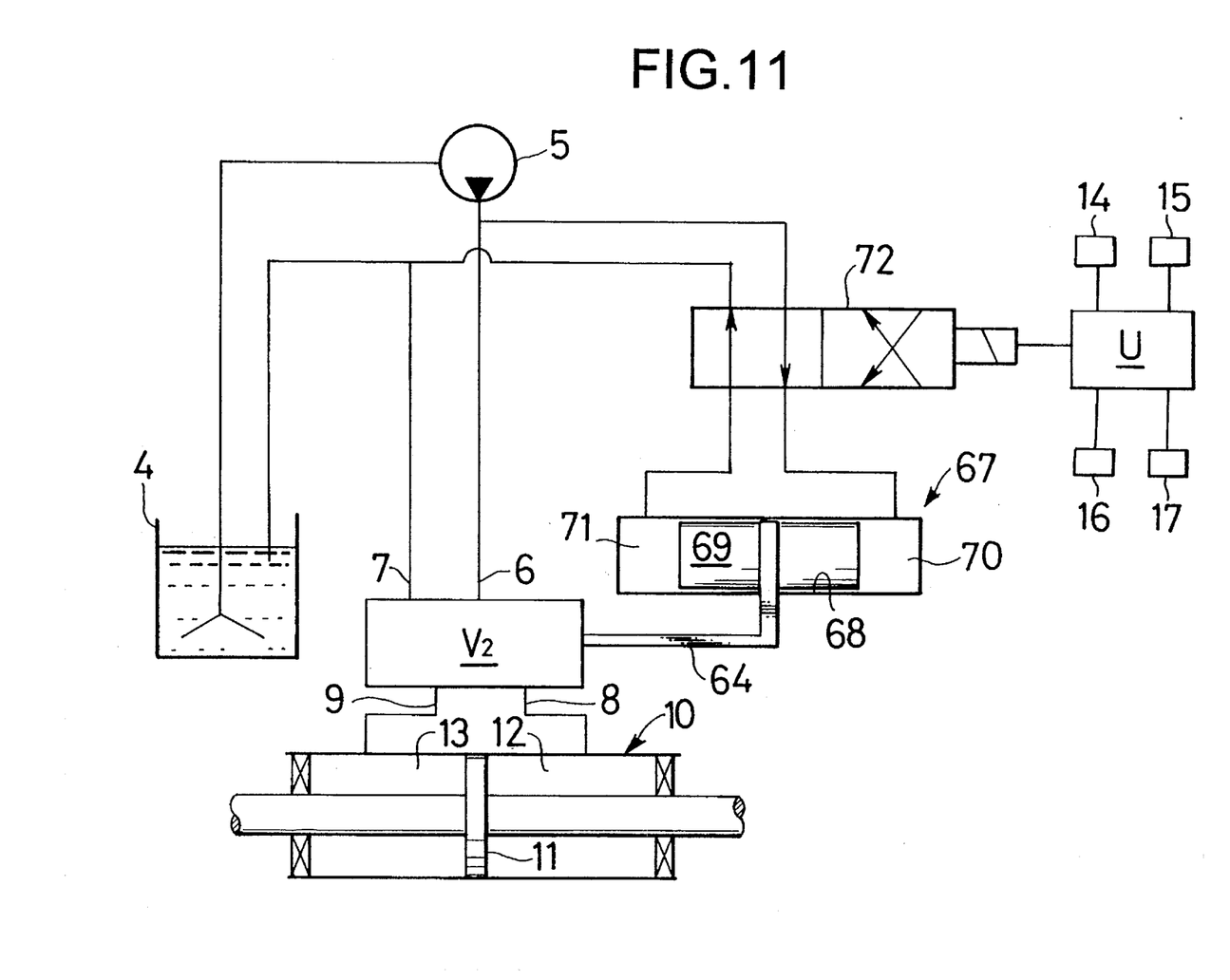
FIG. 11 is a view illustrating a power steering system according to a fifth embodiment of the present invention.

A fifth embodiment of the present invention will be described below in connection with FIG. 11.

A power steering system in the fifth embodiment has a feature in that in place of the torque motor 65, a hydraulic cylinder 67 is used as an actuator for biasing or moving the spool 62 of a 4-way spool valve $V_2$ having the same structure as in the fourth embodiment. The hydraulic cylinder 67 includes a piston 69 slidably received in a cylinder body 68 to engage a rod 64 of the spool 62, and a pair of oil chambers 70 and 71 defined by opposite ends of the piston 69, so that an oil from the hydraulic pump 5 can be selectively supplied through a solenoid valve 72 controlled by the electronic control unit U into one of the pair of oil chambers 70 and 71 in the cylinder body 67, thereby biasing the spool 62 of the 4-way spool valve $V_2$.

In the fifth embodiment, an effect similar to that in the fourth embodiment can be achieved.

As discussed above, according to the first feature of the present invention, the rotary valve is operated by driving the valve actuator on the basis of the steering and motion conditions of the vehicle and rotating the outer sleeve which is rotatably connected to the pinion shaft. Therefore, even if a variation in path unexpected occurs in the vehicle, the power cylinder can be automatically operated to correct the variation in path without obliging the driver to correct the variation in path. Moreover, the steering assist force can be controlled to any extent to provide an enhanced steering feeling by operating the rotary valve.

According to the second feature of the invention, the connecting means for connecting the outer sleeve to the pinion shaft is comprised of the resilient member. Therefore, it is possible to transmit the rotation of the pinion shaft to the outer sleeve, while permitting a rotation of the outer sleeve relative to the pinion shaft.

According to the third feature of the invention, it is possible to transmit the rotation of the pinion shaft directly to the outer sleeve against a resistance to the rotation of the actuator to prevent a delay in the operation of the rotary valve. This is accomplished by preloading the connecting means.

According to the fourth feature of the invention, the 4-way spool valve is operated by driving the valve actuator on the basis of the steering and motion conditions of the vehicle. Therefore, even if an unexpected variation in the path is produced in the vehicle, the power cylinder can be automatically operated to correct the variation in path without obliging the driver to correct the variation in the path. Moreover, the steer assisting force can be controlled to any extent to provide an enhanced steering feeling by operating the valve using the valve actuator.

Although the embodiments of the present invention have been described in detail, it will be understood that the present invention is not limited to these embodiments, and various modifications in design may be made without departing from the spirit and scope of the invention defined in the claims.

We claim:

1. A power steering system for assisting in steering of a vehicle and for automatically controlling the steering in response to variations in vehicle path, said system comprising:

(a) a steering wheel;

(b) an inner sleeve coupled to said steering wheel for rotating in response to a rotation of said steering wheel, said inner sleeve having groove means formed therein;

(c) an outer sleeve positioned around said inner sleeve and coaxial therewith, said inner sleeve and said outer sleeve being rotatable relative to one another, said outer sleeve having groove means formed therein;

(d) rotary valve means formed by the groove means in said inner sleeve and said outer sleeve;

(e) a pinion shaft connected to said outer sleeve;

(f) a rack bar operatively coupled to said pinion shaft;

(g) a torsion bar coupled to said inner sleeve and to said pinion shaft;

(h) connecting means for connecting said pinion shaft and said outer sleeve such that said pinion shaft can rotate relative to said outer sleeve;

(i) actuator means operatively coupled to said outer sleeve for rotating said outer sleeve such that said outer sleeve rotates relative to said pinion shaft and said inner sleeve;

(j) condition detecting means for detecting operating conditions of the vehicle;

(k) control means coupled to an output of said condition detecting means and said actuator means for controlling said actuator means in response to the output of said condition detecting means, wherein operation of said actuator means rotates said outer sleeve with respect to said inner sleeve therein moving corresponding said groove means with respect to one another, wherein said rotary valve means is operated; and (l) power cylinder means coupled to said rotary valve means, wherein operation of said rotary valve means changes a flow path of hydraulic fluid in said power cylinder means wherein said power cylinder means is moved therein providing an assisting force in steering the vehicle.

2. A power steering system as set forth in claim 1, wherein said condition detecting means comprises steering angle sensor means, steering torque sensor means, yaw rate sensor means, and vehicle speed sensor means.

3. A power steering system as set forth in claim 1, wherein said connecting means comprises a resilient member connecting said pinion shaft and said outer sleeve.

4. A power steering system as set forth in claim 3, wherein said resilient member is an elastomer.

5. A power steering system as set forth in claim 4, wherein said pinion shaft includes a notch formed therein and wherein said resilient member is fitted in said notch, said connecting means including a pin radially extending from said outer sleeve wherein said resilient member is supported on said pin within said notch.

6. A power steering system as set forth in claim 3, wherein said resilient member is preloaded by a preset load being configured thereinto.

7. A power steering system as set forth in claim 2, wherein said resilient member is a spring means.

8. A power steering system as set forth in claim 7, wherein said spring means is preloaded.

9. A power steering system as set forth in claim 7, wherein said spring means includes locking portions, and wherein said pinion shaft includes notches, said connecting means including pin means for holding said locking portions in said notches.

\* \* \* \* \*